ent Office 2,943,045
Patented June 28, 1960

2,943,045
RADIOACTIVE MEASUREMENT OF THE FLOW RATE OF A MOVING BED

Donald E. Hull, San Rafael, and Clayton S. Huey, El Segundo, Calif., assignors to California Research Corporation, San Francisco, Calif., a corporation of Delaware Filed Sept. 18, 1956, Ser. No. 610,685

8 Claims. (Cl. 208—165)

This invention relates to processes for treating hydrocarbons wherein in order to carry out such processes there is employed solid particulate material circulating in a closed path of the process system, and wherein the path of flow of said solid particulate material includes a zone in which contact of hydrocarbon material and the solid particulate material is effected, and another zone in which said solid particulate material is regenerated. More particularly, the invention has to do with a method of measuring and controlling the rate of flow of solid particulate material through hydrocarbon processing systems by incorporating and circulating with said solid particulate material a small number of radioactive particles of size and character similar to those of the particles circulating through the system, and thereafter detecting the time required for the passage of said radioactive particles through a spaced portion of said system, whereby the rate of flow of said solid particulate material can be measured and/or controlled.

This application is a continuation-in-part of application Serial No. 320,367, filed November 14, 1952, now abandoned.

In the processing of hydrocarbons, particularly in modern petroleum refining, including the conversion of the hydrocarbons to other products or the refining of them, treatments or techniques are often employed which involve circulating solid particulate material through the process system. The solid material is brought in contact with the hydrocarbons in one zone wherein the hydrocarbons are desirably modified or affected by the presence of the solid material. Following a suitable contact period, the solid particulate material is regenerated or revivified in another zone. One example of a hydrocarbon processing system contemplated by the invention is the catalytic cracking of petroleum fractions employing a moving bed type cracking catalyst, such as the "Houdriflow" cracking process. This process involves the continuous circulation of the pellet or bead type catalyst particles through a reaction zone, and, following reaction, through a catalyst regeneration zone prior to their reintroduction into the reaction zone.

No accurate and consistent method for measuring the bulk rate of flow of the solid particulate material circulating in a closed path of the hydrocarbon processing system has heretofore been known. Because of the nonexistence of a method accurately to measure or control the flow of this solid particulate material, a number of disadvantages and problems attendant prior art practices result. For example, too fast or rapid a catalyst flow in the cracking process hereinabove mentioned results in substantial attrition of the catalyst, with consequent breakdown thereof into smaller particles which are lost from the process system; on the other hand, too slow a catalyst flow rate results in an undesirable buildup of catalyst the hydrocarbon feed becomes improperly distributed on the catalyst, thereby creating serious explosion and other operating hazards. In other instances, improper rate of catalyst flow results in a final product of inferior quality, inefficient over-all operation, and impaired effective capacity of the solid particulate material.

The present invention is based on the discovery of an efficient method for measuring and controlling the bulk flow rate of particulate catalyst or other media circulating in an essentially closed path, which method overcomes the above disadvantage and problems heretofore encountered in the art. More specifically, said method is one for measuring and controlling the bulk flow rate of a mass of solid particles being continuously circulated in a closed path (including a restricted measuring passageway of known volume) through a system which includes at least 2 zones of differing but interdependent function, one of which is a hydrocarbon-contacting, or reaction zone, said method including the steps of introducing at least one radioactive particle into the mass of said flowing particles, passing the resulting mass through a restricted passageway of known volume which is maintained essentially filled to capacity with said flowing particles, detecting the radioactive signals emitted by a radioactive particle as the same enters and leaves said passageway, determining the elapsed time between the entering and leaving signals, thereby determining the bulk flow rate of said solid particles through this and other portions of the closed pathway in the system, and adjusting the rate of flow of said solid particles in response to said determination to an extent necessary to maintain the desired bulk flow rate of the mass of particles in the system.

In carrying out the invention, the circulating solid particle stream with the incorporated radioactive matter flows through a known volume of the circulating system filled to capacity with the flowing solid particulate matter, said volume lying between a position on the circulating system at which there is located means for the detection of radioactivity, such as a Geiger counter, and another position on the circulating system (spaced apart from the first-mentioned position) at which latter position there is located another means for the detection of the passage of radioactive matter. Thus, when a radioactive particle passes the two counters, two successive signals are emitted. As is known, the circulation rate of the solid particles can be obtained by dividing the known volume between the two positions by the observed time interval for passage of the radioactive particle between the two positions.

A plurality of radioactivity detecting means may be employed at each position, such as a set of Geiger counters at each position. Likewise, a plurality of circulating radioactive particles may be incorporated with the circulating particle stream. It has been found that the place of incorporation of the radioactive particles into the solid stream and their mode of addition are not critical. Thus, we can add the radioactive particles to the catalyst mass either before charging the same to the system or at any convenient point of the circulating solids stream system such, for example, as at the top of the lift disengager of a "Houdriflow" system.

While the addition of but one radioactive particle will suffice for a practice of the present invention, it is preferred to add a number of radioactive particles sufficient to ensure the emission of signals at frequent intervals, but below a number at which confusion of radioactive signals due to the near simultaneous detection of more than one particle would occur. When employing a plurality of radioactive particles, it is preferred to incorporate single particles in the solids stream at generally constant time intervals, although it has been found that the simultaneous incorporation of all the particles can be made, if desired, since the particles eventually become randomly distributed throughout the system. Usually the addition of from about 10 to 15 particles is found to be satisfactory in the case of a "Houdriflow" system.

The invention contemplates employing a radioactive particle or particles, the nature or which, such as volume, shape and density, is similar to that of the circulating solid particles. Moreover, the radioactive particle is one that possesses gamma ray activity inadequate to permit ready detection over a relatively long operating period. Thus, a suitable radioactive particle is one made of a refractory material which is insoluble in the hydrocarbon being treated in the process and has a low vapor pressure at the highest operating temperatures encountered in the system. The preferred radioactive particle is obtained from the incorporation of suitable radioactive material in a catalyst or other particle which is representative of those circulating through the system. One method of producing such preferred radioactive particles is to immerse a particle having the desired characteristics in a solution of a radioactive salt, followed by drying after immersion, and then calcining. Suitable radioactive materials are solutions of soluble salts of the radio isotopes zirconium–95, cerium–144, cesium–134, tantalum–182, iridium–192, silver–110, rubidium–86, barium–140, cobalt–60, and zinc–65. Advantageously, the salt selected is one capable of decomposition to an oxide, the free metal, or an insoluble, non-volatile compound. Suitable salts include soluble oxalates, acetates, chlorides, and hydroxides. As specific examples, zirconium may be used as a solution of the oxalate; cerium, silver, zinc, and cobalt, as solutions of the acetate; cesium, rubidium and barium, as solutions of the hydroxide; iridium, as a solution of the tetrachloride; and tantalum, as a solution of potassium tantalate.

Further objects and advantages of the invention will become apparent from the following detailed description taken in conjunction with the accompanying drawings which form an integral part of the present specification.

Figure 1:
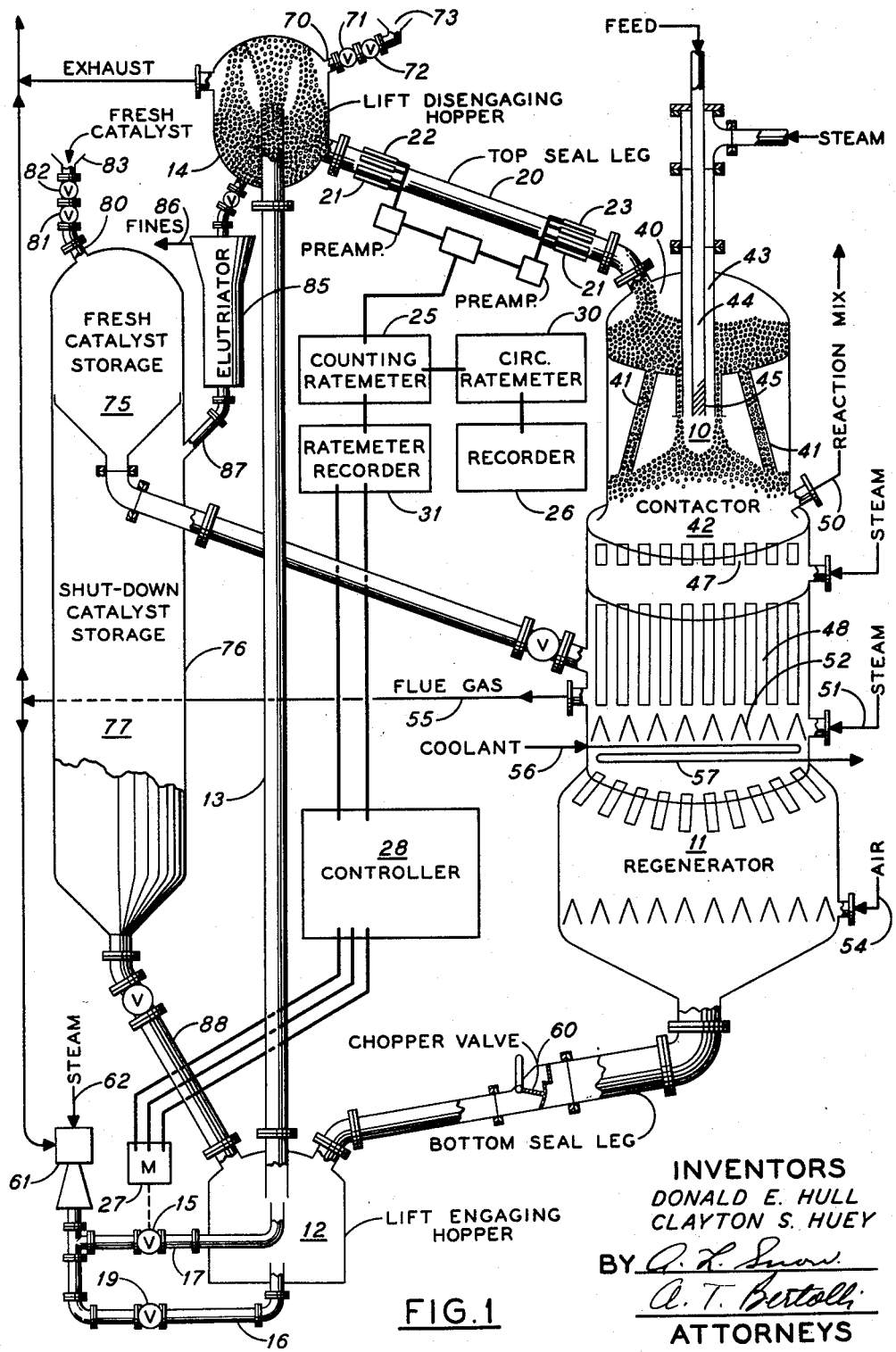
Figure 1 is a schematic representation of one embodiment of the invention as applied to catalytic cracking of hydrocarbons involving the continuous circulation of bead-type catalyst material through a closed path of the process system.

Referring now to Figure 1, the method of the present invention is illustrated as being applied to a system in which hydrocarbon material is brought into contact with a continuously circulating, moving bed of catalyst in a reaction zone 10. The catalyst material then passes into a regeneration zone 11. Following regeneration, the catalyst is returned to reaction or contact zone 10 by means of a gas-lift system which includes a lift-engaging hopper 12, a substantially vertical conduit 13 and a lift-disengaging hopper 14. Control of the rate of catalyst flow through both the reaction zone 10 and regeneration zone 11 is primarily effected by control of a throttling valve 15 which controls velocity and quantity of gas entering the lift system.

As shown, the rate of catalyst flow through vertical conduit 13 is also regulated by gas introduced into lift-engaging hopper 12 through a diffuser stream introduced through conduit 16 and a primary gas stream introduced through conduit 17. The diffuser stream sets the concentration of catalyst in the lift system while the primary stream controls the rate at which regenerated catalyst is propelled upwardly through conduit 13.

In carrying out the invention, the rate of catalyst movement through the closed path, including the hydrocarbon contacting zone, the regeneration zone, and the gas-lift system, is measured by one or more radiation detectors at two positions along the seal leg 20 which is substantially filled with catalyst being returned from the hopper 14 to contact zone 10 via surge chamber 40. The passage of a radioactive bead flowing concurrently with the catalyst material is detected in its passage through seal leg 20 by a plurality of circumferentially placed Geiger counters 21. One ring of these Geiger counters is located at an upper level 22, while a lower ring of counters is indicated at position 23, the volume of the leg portion between the positions 22 and 23 being precisely known. The rate of passage of the radioactive beads is detected by means of a counting rate meter 25 connected to the two rings of spaced Geiger counters, the time interval between energy impulses as a given bead passes from position 22 to position 23 being recorded by a chart recorder 26. This recorder is preferably of the integrating type, in which the average number of counts is recorded against time.

Control of the rate of flow of catalyst moving through the system is effected by the operation of valve 15. As indicated, valve 15 is regulated to increase or decrease the flow of the primary vapor stream in line 17 by reversible electric meter 27. The direction of operation of motor 27 is determined by controller 28 which operates in response to deviations in the time interval between impulses generated at upper and lower counter rings 22 and 23, as detected by recorder 26.

While motor 27 is shown to be operated in response to the output of controller 28, it will be understood that the operation of valve 15 may be effected manually. For facilitating manual control, there is provided a circulation rate meter 30 operable in response to counting rate meter 25 and graphically recorded by circulation rate meter recorder 31. In this way, a graphic representation may be made of the rate of flow of catalyst through the entire system to facilitate the manual adjustment of valve 15 to increase or decrease in a compensatory direction the rate of flow of catalyst through the system.

It will be observed that valve 19 is provided for control of the diffuser stream entering lift-engaging hopper 12 by way of conduit 16. Valve 19 may likewise be placed under the control of motor 27 or it may be manually controlled to increase or decrease the diffusion of catalyst in the lift-engaging hopper.

For a better understanding of the system to which the invention has been applied, reference is again made to Figure 1, wherein hot regenerated catalyst flows from the lift disengaging hopper 14 through the filled, measuring passageway in seal leg 20 to the surge chamber 40 in the top of the reaction section 10. Part of the catalyst flows downwardly from the surge chamber 40 through a plurality of standpipes 41 to the main catalyst mass 42 in the reaction section 10. The bulk of the catalyst (80% or more) flows downwardly through the annular space 43 concentric with the pipe 44, carrying partially vaporized feed and steam. Jets 45 at the discharge end of pipe 44 distribute the hydrocarbon feed with a swirling motion through the curtain of descending catalyst from annular space 43, thus securing complete vaporization of the hydrocarbon and good distribution over the catalyst. The catalyst flows from the reaction section 10 through a baffle plate 47 into a product disengaging section 48. All hydrocarbon material leaves the reactor through product line 50, except for carbon deposited on the catalyst during the cracking reaction, together with a portion of the steam introduced through line 51 into purge section 52. After passing through said section, the catalyst flows through the kiln section 11, where carbon is burned off with air introduced through line 54. Combustion products leave the system through line 55. Coolant, introduced through line 56, is circulated through closed coil 57 to avoid excessive temperatures. Hot catalyst leaving the kiln section 11 is throttled through a manually controllable chopper valve 60 into lift-engaging hopper 12. A portion of the combustion products, i.e., flue gas in line 55 is compressed, for example, by means of a jet type compressor 61 energized by high pressure steam in line 62, throttled, and distributed through the flow control valve 15 and diffuser valve 19 to the lift-engaging hopper 12. The catalyst is thus forced to flow upward through the lift line 13 to the lift disengaging hopper 14, thus completing the circuit.

As mentioned hereinabove, the radioactive beads are introduced into the closed, continuously circulating path at the lift-disengaging hopper 14 through line 70 having valves 71 and 72 provided therein for equalizing pressures between the atmosphere and hopper 14. As shown, the radioactive beads may be dropped into a feed hopper 73 with valve 72 open and valve 71 closed. The beads are then introduced into the catalyst flow path by closing valve 72 and opening valve 71, thereby permitting the beads to be drawn through line 70 into lift-disengaging hopper 14.

Alternatively, the radioactive beads may be introduced with fresh catalyst which is normally stored in the upper portion 75 of the catalyst storage vessel 76, the lower portion 77 of which serves as a used catalyst storage zone. As illustrated, both fresh catalyst and the radioactive beads may be introduced through line 80 and valves 81 and 82 intermediate the fresh catalyst storage zone 75 and a feed hopper 83. Valves 81 and 82 are operated in manner similar to that described for valves 71 and 72 to introduce fresh catalyst and the radioactive beads from feed hopper 83.

For the purpose of removing fines or other broken catalyst particles from the closed circulation path, an elutriator 85 is provided between lift-disengaging hopper 14 and used catalyst storage zone 77. In normal operation a portion of the particulate catalyst material is withdrawn from the lift-disengaging hopper 14 and passed through the elutriator wherein disintegrated particles are removed through withdrawal line 86 while the separated solid particulate material is returned to the flow system through line 87. The used catalyst, after storage in zone 77, is returned to the continuous closed flow path through line 88 interconnected with the lift-engaging hopper 12.

Figure 2:
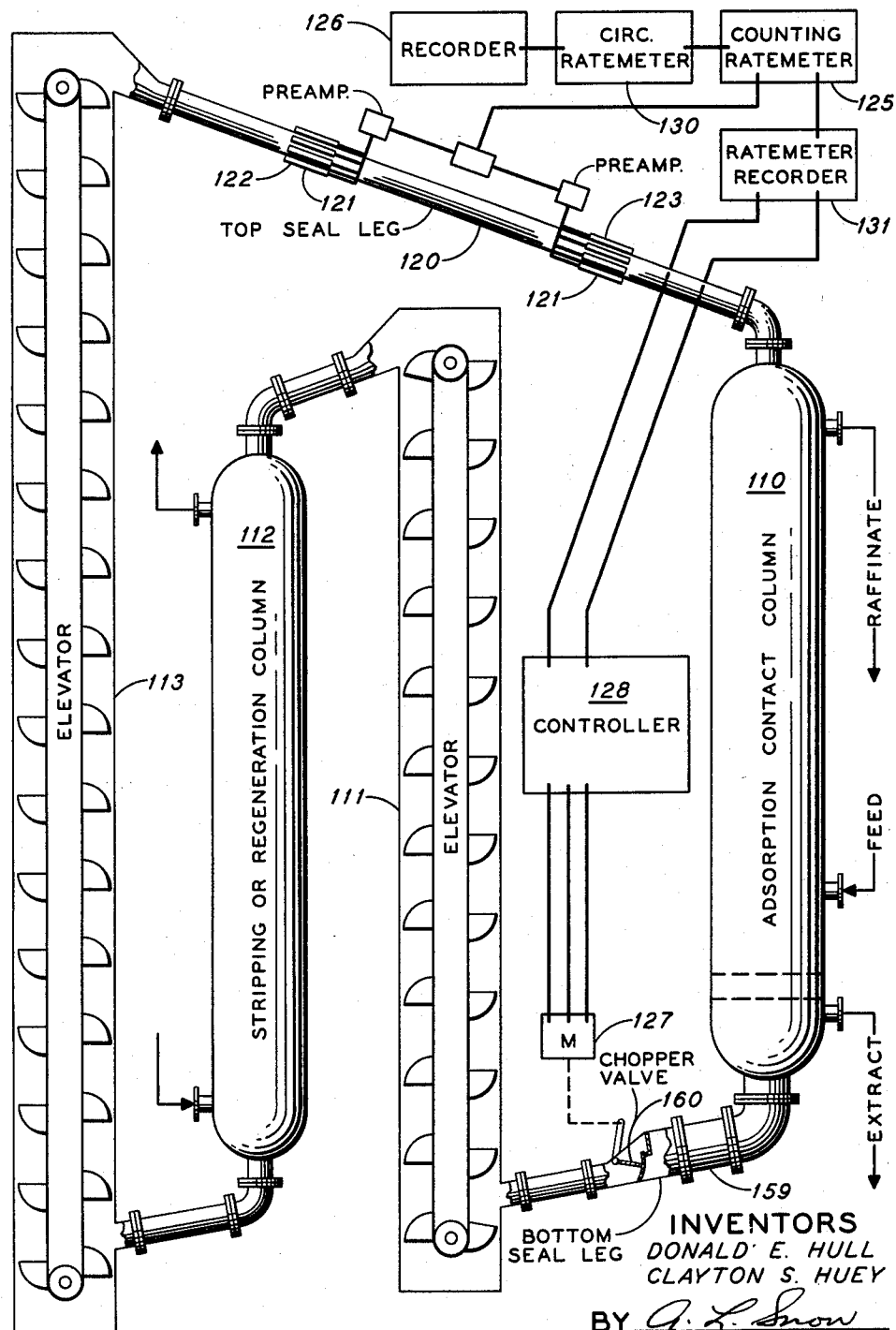
Figure 2 is a schematic representation of a continuous adsorption process for the fractionation of hydrocarbons involving the continuous circulation of solid particulate material as adsorbent, to which the present invention has been applied.

Reference is now made to Figure 2, wherein there is illustrated another type of system to which the invention has been applied and in which solid particulate material is continuously circulated in a closed path. The hydrocarbon processing system of Figure 2 is normally referred to as an adsorption system whereby physical separation of a hydrocarbon stream is effected in a moving bed of adsorbent particles of bead-like form within contact or adsorption column 110. Following separation of an extract by adsorption of the hydrocarbon material on the particulate material, the particles are transported by an elevator 111 to a regeneration or stripping column 112 wherein raffinate is stripped from the beads to rejuvenate the particles. The beads are then returned to the adsorption column through a second elevator 113 and a flow line, designated as top seal leg 120, connected to the top of adsorption column 110, said leg 120 being filled with the flowing adsorbent beads.

In accordance with the invention, the rate of flow of the solid particulate material, which in the present example serves as the adsorbent, is detected by measuring the rate of flow through a known volume of top seal leg 120 as determined by Geiger counters 121 positioned at an upper level 122 and a lower level 123. Upon passage of a radioactive particle incorporated with the mass of adsorbent particles flowing through conduit 120, the Geiger counters 122 initiate a signal which, after passage through a preamplifier, is measured at counting rate meter 125 and recorded on recorder 131. As shown, the output of rate meter recorder 131 is employed by controller 128 to operate reversible motor 127 to position chopper valve 160 to affect the rate of flow of adsorbent material from adsorption column 110 to elevator 111 and regeneration column 112. The position of chopper valve 160 is adjusted by controller 128 and motor 127 in a compensatory direction and to a degree necessary to maintain at a predetermined value, the rate of flow of solid particulate material through the entire closed path of the system.

For a more detailed description of the adsorption process illustrated in Figure 2, reference may be had to Claussen Patent 2,582,415, issued January 15, 1952, wherein the operation of the adsorption column and stripping column to separate physically the hydrocarbon materials in the presence of a flowing stream of particulate material is set forth in detail.

While control of the rate of flow of solid particulate material through the adsorption system of Figure 2 has been illustrated as being effected by the opening and closing of chopper valve 160 in bottom seal leg 159, it will be apparent that the rate of flow may be controlled by varying the speed of the drive mechanism for elevators 111 and 113. However, in the preferred form of apparatus the driving means (not shown) for the elevators are preferably of the constant-speed type, such as a steam turbine or an induction motor. Accordingly, in the arrangement of Figure 2, the rate of flow of adsorbent material is placed under the control of chopper valve 160.

While two hydrocarbon processing systems have been illustrated in the accompanying drawings wherein solid particulate material is circulated in a closed path which includes a contact zone and a regeneration zone, it will be apparent that the invention illustrated and described in conjunction therewith may be applied to other hydrocarbon processing systems wherein the flow of solid particulate material must be controlled to obtain optimum quality of product and capacity of the system. Among these hydrocarbon systems may be mentioned catalytic reforming, pebble coking, hydroforming, dehydrogenation, hydrogenation, and oil shale retorting.

Obviously, many modifications and variations of the invention, as hereinbefore set forth, may be made without departing from the spirit and scope thereof, and therefore, only such limitations should be imposed as are indicated in the appended claims.

We claim:

1. A method for measuring the bulk flow rate of a free-flowing mass of solid particles which comprises continuously recirculating said mass of particles through a closed system which includes at least two zones of differing but interdependent function and in one of which zones hydrocarbons are contacted with a free-flowing moving-bed of said solid particles, introducing a solid radioactive particle into said mass of recirculating flowing particles, passing the resulting mass containing said radioactive particle through a restricted measuring zone of known volume and thence returning the flowing mass to said system, maintaining said measuring zone filled with said flowing solid particles, detecting the radioactive signal when said radioactive particle enters said measuring zone, again detecting the radioactive signal when said radio-active particle leaves said measuring zone, measuring the lapsed time between said entering and said leaving signals, said lapsed time so observed being a measure of the bulk flow rate of said mass of particles through the system, continuing to recycle said mass of particles including said radioactive particle and repetitively detecting the entering and leaving signals from said radioactive particle and the lapsed time between said signals when it is carried through said measuring zone with said recirculating mass of particles.

2. The process of claim 1 wherein, in response to said measurements the rate of flow of said mass of solid particles is adjusted to an extent and in a direction necessary to maintain the bulk flow rate of the mass of particles in the system within desired limits of a predetermined value.

3. The method of claim 1 wherein a plurality of solid radioactive particles are introduced into said mass, said particles being spaced apart so as to substantially preclude confusion of radioactive signals due to near simultaneous detection of more than one particle entering and leaving said measuring zone.

4. The method of claim 1 wherein the mass of solid particles are comprised of a hydrocarbon conversion catalyst and wherein the system includes a hydrocarbon conversion zone and a catalyst regeneration zone.

5. The method of claim 1 wherein the particles are a cracking catalyst of the bead type.

6. The method of claim 5 wherein the particles are a cracking catalyst of the bead type.

7. The method of claim 5 wherein the particles are a cracking catalyst of the pellet type.

8. The method of claim 1 wherein the system includes a hydrocarbon adsorption zone and a hydrocarbon stripping zone and the mass of recirculating particles are a selective hydrocarbon adsorbent.

References Cited in the file of this patent

UNITED STATES PATENTS

| | | |
|---|---|---|
| 2,491,445 | Cunningham et al. | Dec. 13, 1949 |
| 2,582,415 | Claussen | Jan. 15, 1952 |
| 2,617,941 | Craggs | Nov. 11, 1952 |
| 2,631,242 | Metcalf | Mar. 10, 1953 |
| 2,640,936 | Pajes | June 2, 1953 |
| 2,674,363 | Graham | Apr. 6, 1954 |

UNITED STATES PATENT OFFICE
CERTIFICATE OF CORRECTION

Patent No. 2,943,045                                  June 28, 1960

Donald E. Hull et al.

It is hereby certified that error appears in the printed specification of the above numbered patent requiring correction and that the said Letters Patent should read as corrected below.

Column 7, lines 11 and 13, for the claim reference numeral "5", each occurrence, read -- 4 --.

Signed and sealed this 20th day of December 1960.

(SEAL)

Attest:

KARL H. AXLINE
Attesting Officer

ROBERT C. WATSON
Commissioner of Patents